United States Patent [19]

Meyers et al.

[11] 3,896,164

[45] July 22, 1975

[54] 3-DIHALOMETHYL-1-CARBOXY-1,2,2-TRIMETHYLCYCLOPENTANE

[75] Inventors: Cal Yale Meyers, Carbondale, Ill.; Ashok M. Malte, Poona, India

[73] Assignee: Southern Illinois University Foundation, Carbondale, Ill.

[22] Filed: Dec. 14, 1970

(Under Rule 47)

[21] Appl. No.: 98,079

[52] U.S. Cl. ..... 260/514 J; 260/501.16; 260/570.9; 260/588
[51] Int. Cl. ............................................. C07c 61/06
[58] Field of Search......... 260/514 G, 514 J, 468 G, 260/468 J

[56] References Cited
OTHER PUBLICATIONS

Conia et al., Bull. Soc. Chem., France, 703, (1963).
Ghosez et al., Tet. Letters, 139, (1966).
Rodds Chemistry of Carbon Compounds, 2nd Ed., IIc, pp. 208–212, (1969).
Kofron et al., J. 0., Chem. 28,873, (1963).
Meyers et al., JACS, 91, 7510, (1969).
Cram et al., Organic Chemistry, pp. 473, 474, 549, (1964).
Komppa, Berichte d. D Chem. Gesellschaft, 41, 4470, (1908).

Primary Examiner—Robert Gersil
Attorney, Agent, or Firm—Koenig, Senniger, Powers and Leavitt

[57] ABSTRACT

3-Dihalomethyl-1-carboxy-1,2,2-trimethylcyclopentanes are novel compounds useful in resolving racemic mixtures. The acids are prepared by reaction of camphor with a carbon tetrahalide in the presence of a strong base and a polar solvent. Camphor carbanions attack the carbon tetrahalide to produce $\alpha,\alpha$-dihalocamphor and dihalocarbene. $\alpha,\alpha$-Dihalocamphor reacts with hydroxyl ions to form the novel acids.

15 Claims, No Drawings

3-DIHALOMETHYL-1-CARBOXY-1,2,2-TRIMETHYLCYCLOPENTANE

BACKGROUND OF THE INVENTION

This invention relates to the field of organic chemistry and more particularly to ionic reactions of certain carbon tetrahalides with various organic compounds.

Carbon tetrachloride is generally considered to be a compound of limited chemical reactivity and has found application in a number of services which capitalize on its relative chemical inertness. Thus, for example, carbon tetrachloride is useful as a fire extinguishing agent, as a cleaning solvent and as a solvent for organic chemical reactions. For many years carbon tetrachloride found its principal application as a solvent, particularly for cleaning purposes. Recently, this market has been substantially closed off, however, due to government restrictions relating to the toxicity of carbon tetrachloride.

The use of carbon tetrachloride as a chemical intermediate has heretofore been restricted to a few specialized reactions. Commercial production of chloroform, for example, is carried out by reduction of carbon tetrachloride with iron and water. Compounds marketed under the trade designation "Freons" such as dichlorodifluoromethane and trichloromonofluoromethane are produced commercially by partially displacing chlorine from carbon tetrachloride with fluorine. The production of such "Freon" compounds has represented the principal commercial outlet for carbon tetrachloride for several years, and in recent years has provided the only major market for this material.

In 1876, Reimer and Tiemann discovered that phenol could be converted to ortho and parahydroxybenzaldehydes by reaction with chloroform in an aqueous alkaline medium. When they substituted carbon tetrachloride for chloroform, added ethanol and held the reaction mixture in a sealed tube at 100°C. for 3 days, a mixture of ortho and parahydroxy benzoic acid was produced. The work of Reimer and Tiemann with carbon tetrahalides was limited to the particular reaction noted above, i.e., the addition of a carboxylic acid group para or ortho to a phenolic hydroxy group, using an ethanolic aqueous alkaline medium.

Because of its abundance and relative inexpensiveness, carbon tetrachloride is potentially a very attractive chemical intermediate. Prior to the present invention, however, this compound was considered to be a substantially inert material whose chemical activity was limited to certain particular reactions such as those outlined above.

SUMMARY OF THE INVENTION

It is an object of the present invention to provide a method of producing useful compounds by reaction of camphor and camphor derivatives with carbon tetrahalides such as carbon tetrachloride and carbon tetrabromide. It is a further object of this invention to convert camphor and camphor derivatives to certain novel and useful compounds by reaction with carbon tetrahalides. Other objects and features will be in part apparent and in part pointed out hereinafter.

Briefly, the present invention is directed to a process for producing 3-dihalomethyl-1-carboxy-1,2,2-trimethylcyclopentanes which are novel compounds useful for resolving racemic mixtures. The process comprises reacting di-$\alpha$-halogenated camphor with hydroxyl in the presence of $CBr_mCl_nF_p$ where $m$ and $n$ are integers between 0 and 4 inclusive, $p$ is an integer between 0 and 2 inclusive, and $m+n+p = 4$.

The invention is also directed to such a process in which the di-$\alpha$-halogenated camphor is intially prepared by reacting mono-$\alpha$-halogenated camphor with $CBr_mCl_nF_p$ in the presence of a strong base and a polar solvent. The invention is further directed to such a process wherein the mono-$\alpha$-halogenated camphor is initially prepared by reacting camphor with $CBr_mCl_nF_p$ in the presence of a strong base and a polar solvent.

DESCRIPTION OF THE PREFERRED EMBODIMENTS

Camphor is a compound which is not readily halogenated. In fact, it does not react directly with chlorine or bromine at all. As noted above, carbon tetrahalides are generally not very reactive compounds either. Surprisingly, however, camphor is successfully dihalogenated by certain carbon tetrahalides in the presence of a strong base and a polar compound and the resulting dihalogenated species undergoes a subsequent ring cleavage in situ to form the novel 3,3-dihalomethyl-1,2,2-trimethylpentane carboxylic acids of this invention. These reactions proceed rapidly at moderate temperatures, for example room temperature or less up to the reflux temperature of the system.

Those skilled in the art will recognize that the 3-dihalomethyl-1-carboxy-1,2,2-trimethylcyclopentanes may be produced from mono-$\alpha$ or di-$\alpha$-halogenated camphors separately prepared in accordance with known methods. In view of the relative ease with which camphor is halogenated by the reactions of this invention, however, and the advantages of preparing both the intermediate and the acid product in a common reaction, use of camphor as the starting material is strongly preferred.

While we do not wish to be held to any particular theory, it is postulated that the reactions involved in the present invention proceed in the following manner (with $CX_4$ being shown as the carbon tetrahalide):

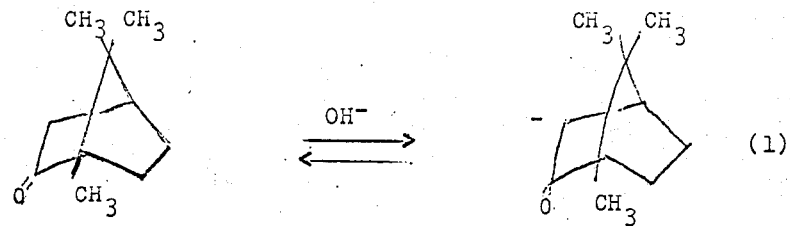

(1)

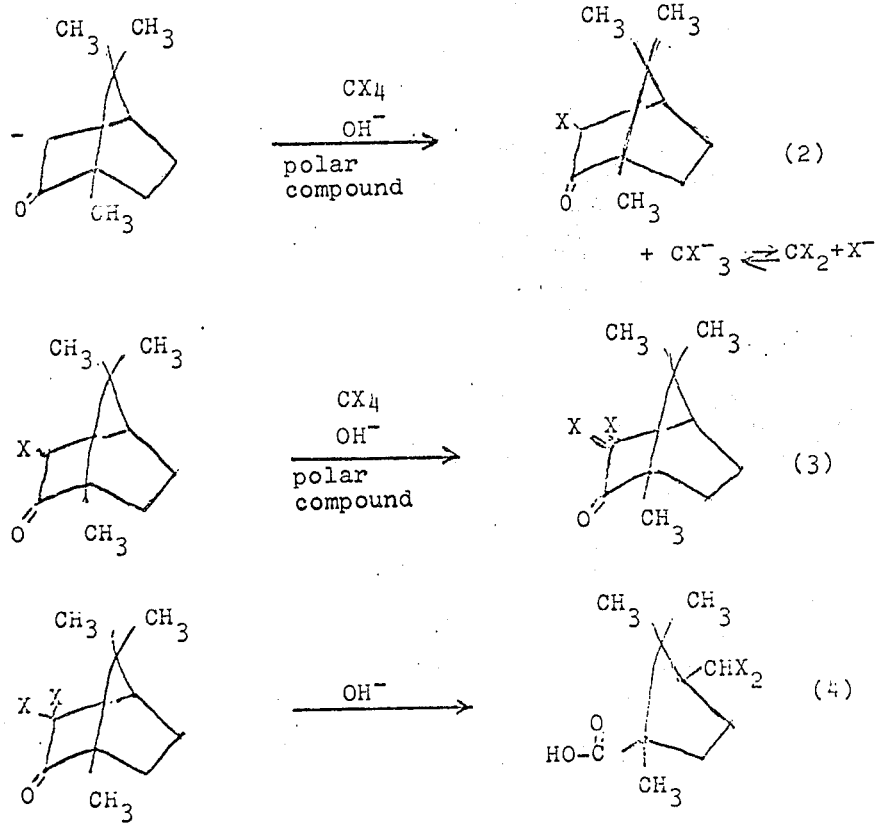

In reaction (1), the camphor substrate associates with the strong base, yielding a nucleophilic carbanion which is stabilized by the polar solvent. The stabilized carbanion in turn attacks one of the halogen atoms of the carbon tetrahalide [equation (2)], yielding a monohalogenated intermediate and a trihalomethyl ion which dissociates into a dihalocarbene and a halide ion. The monohalogenated intermediate is attacked by an additional molecule of carbon tetrahalide, producing a dihalogenated species and additional dihalocarbene [equation (3)]. The dihalogenated species is attacked at the carbonyl group by a hydroxyl ion, and converted by what is essentially a haloform reaction mechanism to the carboxylic acid with cleavage of the ring at the bond between the halogenated carbon atom and the carbonyl group.

Under conditions wherein the strong base remains a solid during the reaction, the halide ion produced in equation (2) forms the halide salt of the metal of the strong base and precipitates. This halide salt often tends to collect at and coat the surface of the strong base, thus impeding the formation of the Nu:⁻ anion per equation (1) and the formation of products per equation (3). The rates and yields of the reactions of the invention, particularly those where the kinetics of the anion formation are relatively slow, may be adversely affected by this phenomenon. It is preferred, therefore, that a small quantity of water be present in the reaction medium, especially in those reactions where anion formation is slow. In such instances, the presence of an amount of water on the order of 1 mole per mole of substrate dissolves the halide salt as it is formed and prevents the interference of the salt with the formation of either the carbanion or the products.

Essentially any polar solvent which is compatible with carbon tetrahalide may be used in the reactions of this invention. Thus, for example, alcohols, polyols, cyclic ethers, aliphatic ethers, cyclic polyethers, aliphatic polyethers, tetrahydrofuran, glyme, diglyme, liquid ammonia or liquid sulfur dioxide serve as suitable solvents. Tertiary butyl alcohol has been found to be a particularly useful solvent since it does not react with camphor and has sufficient volatility to be readily stripped off during product recovery.

The preferred carbon tetrahalide reactant is $CCl_4$. However, $CBr_4$, as well as the "mixed" halides $CBrCl_3$, $CBr_2Cl_2$, and $CBr_3Cl$ also perform satisfactorily in these reactions. "Freons" having no more than 2 fluorine atoms are also useful tetrahalides. Generally, any carbon tetrahalide having the formula $CBr_mCl_nF_p$ where $m$ and $n$ are integers between 0 and 4 inclusive, $p$ is an integer between 0 and 2 inclusive, and $m+n+p = 4$ may be used.

A variety of strong bases may be employed in the reactions of this invention, including, e.g., alkaline hydroxides and alkali metal alkoxides.

The reactions of this invention proceed rapidly in high yield at moderate temperatures. Temperatures from just above the solidification point of the reaction system up to a temperature of about 250°C. may be employed. Higher temperatures can be tolerated but are normally unnecessary. Conveniently the reactions are simply carried out at room temperature. To facilitate particularly rapid reactions and high conversion, the reaction system is maintained above atmospheric reflux temperature, for example 150°C.

The relative proportions of reactants are in no way critical, and may be varied widely. A substantial excess of carbon tetrahalide, base and polar solvent promotes rapid reaction and high conversions. Lower excesses, however, provide larger reactor payloads and, as those skilled in the art will appreciate, the optimum commercial reactant ratios depend on the substrates and products involved, the capacities desired, the separation processes selected, and whether batch or continuous operations are employed.

In the processes of this invention, the product may be recovered from the reaction mixture by any convenient means known to the art. Thus, various combinations of distillation, crystallization, filtration and extraction may be used. In one particularly convenient method of recovering the product, water is added to the residue and the resultant mixture extracted with a first aliquot of an organic solvent such as ether. Prior to this first extraction, it may be convenient to strip off excess solvent, particularly where high relative proportions of carbon tetrahalide and polar solvent are used. An alkaline solution containing the bulk of the product is separated from the organic solvent extract. If the latter contains significant quantities of product, it should be washed with water and the washings mixed with the alkaline solution. The alkaline solution is then acidified and extracted with a second aliquot of an organic solvent. The second organic solvent extract, containing the product, is washed with water, dried, filtered and evaporated to recover the product. The first organic solvent extract, after washing, may also be dried and evaporated to recover unconverted substrate material.

3-Dihalomethyl-1-carboxy-1,2,2-trimethylcyclopentanes are optically active products. The d-acid is produced from d-camphor, and the l-acid from l-camphor. Each of these isomers has been found useful in resolving racemic mixtures, e.g., optically active amines and alcohols. Thus, the d-isomer of phenylethyl amine may be separated from its corresponding l-isomer by the marked relative differential solubility of the two different diastereomeric salts, i.e., the d-amine d-acid salt, d-phenylethyl ammonium d-3,3-dihalomethyl-1,2,2-trimethylcyclopentane carboxylate and the l-amine d-acid salt, l-phenylethyl ammonium d-3,3-dihalomethyl-1,2,2-trimethylcyclopentane carboxylate, in acetone. Similarly, optically active alcohols are separated by means of the differential solubility of the d,d ester and the l,d ester of the novel acids of this invention. In accordance with the invention, racemic mixtures of amines or alcohols may be readily resolved by adding an amine or alcohol and one of the novel acids of the invention to an appropriate solvent thus causing precipitation of an ester or amine slat of the acid. The d or l form of the amine or alcohol may then be recovered, as by filtering the precipitate from the mother liquor and treating the filter cake with a strong alkali.

The following examples illustrates the invention:

EXAMPLE 1

A mixture of 0.010 moles d-camphor, 0.200 moles powdered solid potassium hydroxide, 0.258 moles carbon tetrahalide, 0.264 moles tertiary butyl alcohol and 0.011 moles of water were stirred under reflux for 45 minutes. Excess solvent was then stripped off under vacuum, water was added to the residue and the residue was extracted with ether. The resultant alkaline aqueous phase was separated from the ether extract and the latter was washed with water. The washings were combined with the alkaline solution and the combined aqueous phase was acidified and again extracted with ether. The second ether extract was washed with water, dried with anhydrous magnesium sulfate, filtered and concentrated under vacuum to yield 1.6 g. of d-3-dichloromethyl-1-carboxy-1,2,2-trimethylcyclopentane. This material was recrystallized from aqueous ethanol to yield a partially purified material having a melting point of 128°C.

EXAMPLE 2

A mixture of 4.62 g. d-$\alpha$-bromo camphor, 22.4 g. powdered potassium hydroxide, 50 ml. tertiary butyl alcohol, 50 ml. carbon tetrachloride and 2 ml. water were stirred under reflux for 22 hours. By a method similar to that described in Example 1, 2.0458 g. of a product identified as 3-dichloromethyl-1-carboxy-1,2,2-trimethylcyclopentane were recovered.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A compound selected from the group consisting of d- and l-3-dihalomethyl-1-carboxy-1,2,2-trimethylcyclopentanes wherein halo is chlorine or bromine.

2. A compound as set forth in claim 1 wherein the compound is d-3-dichloromethyl-1-carboxy-1,2,2-trimethylcyclopentane.

3. A compound as set forth in claim 1 wherein the compound is l-3-dichloromethyl-1-carboxy-1,2,2-trimethylcyclopentane.

4. A process for preparing 3-dihalomethyl-1-carboxy-1,2,2-trimethylcyclopentane from $\alpha,\alpha$-dihalocamphor which comprises reacting $\alpha,\alpha$-dihalocamphor, in the presence of a base and a carbon tetrahalide represented by the formula $CBr_mCl_nF_p$ where $m$ and $n$ are integers between 0 and 4 inclusive, $p$ is an integer between 0 and 2 inclusive and $m+n+p=4$, with hydroxyl ions to effect cleavage of the camphor ring and form 3-dihalomethyl-1-carboxy-1,2,2-trimethylcyclopentane.

5. The process as set forth in claim 4 wherein the $\alpha,\alpha$-dihalocamphor is initially prepared by reacting $\alpha$-halocamphor with said carbon tetrahalide in the presence of a strong base and a polar solvent.

6. The process as set forth in claim 5 wherein the $\alpha$-halocamphor is initially prepared by reacting camphor with said carbon tetrahalide in the presence of a strong base and a polar solvent.

7. The process as set forth in claim 4 wherein the carbon tetrahalide is carbon tetrachloride.

8. The process set forth in claim 4 wherein the reaction mixture additionally contains a small proportion of water.

9. The process set forth in claim 4 wherein the reaction takes place at a temperature between the solidification point of the reaction mixture and about 250°C.

10. The process set forth in claim 5 wherein said strong base is potassium hydroxide and said polar solvent is tertiary butyl alcohol.

11. The process set forth in claim 6 wherein the reaction takes place at room temperature.

12. The process set forth in claim 6 wherein the reaction takes place at about 150°C.

13. The process set forth in claim 4 wherein the product is separated from the reaction mixture by:

adding an aqueous material and a first aliquot of a water-immiscible organic solvent to the reaction mixture;

separating the resultant alkaline aqueous phase containing the product from the organic base;

acidifying the aqueous phase;

extracting the product from the acidified aqueous phase with a second aliquot of a water-immiscible organic solvent; and recovering the product from the extract.

14. A process for preparing 3-dihalomethyl-1-carboxy-1,2,2-trimethylcyclopentane from $\alpha,\alpha$-dihalocamphor which comprises:

reacting $\alpha,\alpha$-dihalocamphor in the presence of solid potassium hydroxide, a polar solvent and a carbon tetrahalide represented by the formula $CBr_mCl_nF_p$ where $m$ and $n$ are integers between 0 and 4 inclusive, $p$ is an integer between 0 and 2 inclusive, and $m+n+p = 4$, with hydroxyl ions to effect cleavage of the camphor ring and form the carboxylic acid.

15. A process as set forth in claim 14 wherein said polar solvent is tertiary butyl alcohol.

* * * * *